United States Patent [19]

Kautetzky

[11] 4,148,401
[45] Apr. 10, 1979

[54] TRANSPORT AND ASSEMBLY APPARATUS FOR SCREW-TIGHTENING DEVICES

[75] Inventor: Anton Kautetzky, Forchheim, Fed. Rep. of Germany

[73] Assignee: Kraftwerk Union Aktiengesellschaft, Mülheim, Fed. Rep. of Germany

[21] Appl. No.: 784,531

[22] Filed: Apr. 4, 1977

[30] Foreign Application Priority Data

Apr. 5, 1976 [DE] Fed. Rep. of Germany ....... 2614654

[51] Int. Cl.² ................................................ B66F 5/04
[52] U.S. Cl. .................................... 414/590; 414/642; 414/680
[58] Field of Search ............... 214/1 D, 701 R, 701 P, 214/1 A, DIG. 1, 130 A; 254/9 R, 9 C, 122, 134

[56] References Cited

U.S. PATENT DOCUMENTS

| 2,621,891 | 12/1952 | Marsh | 214/1 D |
|---|---|---|---|
| 3,648,856 | 3/1972 | Gaarder | 214/1 D |
| 3,727,774 | 4/1973 | Wolfe | 214/1 D |

FOREIGN PATENT DOCUMENTS 7021273 6/1970 Fed. Rep. of Germany ...... 292/256.71

OTHER PUBLICATIONS

German Magazine, "Werkstatt und Betrieb", pp. 333–336 104 (1971).

Primary Examiner—Francis S. Husar
Assistant Examiner—George F. Abraham
Attorney, Agent, or Firm—Herbert L. Lerner

[57] ABSTRACT

Transport and assembly apparatus for a screw-tightening device having a carrier ring seatable on a pressure-vessel cover for loosening and tightening fastening screws thereon includes a lift truck having an elevating platform whereon a carrier ring is mountable, means for pivoting the carrier ring about a horizontal axis, and means for vertically adjusting the carrier ring with the elevating platform.

14 Claims, 17 Drawing Figures

TRANSPORT AND ASSEMBLY APPARATUS FOR SCREW-TIGHTENING DEVICES

The invention relates to a transport and assembly apparatus for screw-tightening devices with which fastening screws of pressure-vessel covers are loosenable and tightenable. Such screw-tightening devices are well known and have many different types of construction as exemplified in German Published Non-Prosecuted Application DT-OS No. 2 258 859, and German Petty Patent DT-GM No. 7 021 273. They operate hydraulically, preferably, being provided with a carrier ring corresponding to the hole circle of the fastening screws, the carrier ring being seatable on the pressure-vessel cover, and containing in the interior thereof hydraulically actuatable work pistons which surround the screw or screw-bolt shaft, the force of the tightening piston being introducible, through an auxiliary member disposable on the end of the screw, into the screw shaft for expanding or stretching the latter. This hydraulic stretching of the screw shafts is effected, on the one hand, by loosening the fastening or retaining nuts in order to free them and, on the other hand, by tightening the cover screw joint, as the retaining nuts, when the screw shafts are stretched, are screwed against the cover with defined hydraulic prestressing, so that after the hydraulic pressure has ceased, the defined prestressing remains.

The invention starts from the consideration that such hydraulic screw-tightening devices are suited not only for fastening and loosening the cover screw joint in reactor pressure vessels, but also that they are employable also in simpler form for fastening and loosening the manhole covers of steam generators or pressure receptacles in nuclear power plants with pressurized-water reactors. In this connection, for example, the manholes (assembly openings having a diameter of 500 mm) of the nuclear steam generating system are closed by covers weighing about 600 kg. The tightness of the manholes, which are subjected to working pressure, is also attained by prestressing the connecting screws. In the steam generator-primary side, the manhole covers are assembled with an inclination of 45° at the underside of the steam generator; on the steam generator-secondary side, the manhole covers are assembled in vertical position because the corresponding manhole connecting piece is oriented axially normal to the longitudinal axis of the steam generator. In the pressure receiver or receptacle, the manhole covers are assembled vertically. The hole circle diameter of the manholes in the case of pressurized water-nuclear power plants manufactured by Kraftwerk Union Aktiengesellschaft of Mulheim (Ruhr), Germany is a standard 670 mm, and an hydraulic screw-tightening device with carrier ring matching those manholes weighs about 300 kg. The assembly and disassembly of the manhole covers and the screw-tightening device without any special auxiliary means i.e. if necessary with the aid of the available building crane or traveling crabs or trolleys, under the given spatial conditions, is exceptionally time consuming, and the physical stress upon the operating personnel lies close to unreasonable limits.

It is according an object of the invention to provide a transport and assembly apparatus for screw-tightening devices of the foregoing type with which physical stress of the assembly personnel during transport and assembly of the screw-tightening device is very greatly reduced. Further objects of the invention is to provide such an apparatus which will basically also be suited for the transport and assembly of manhole covers and which will also result in a shortening of the total transport and assembly times to a minimum so that the radiation load is also reduced.

With the foregoing and other objects in view, there is provided, in accordance with the invention, a transport and assembly apparatus for a screw-tightening device having a carrier ring seatable on a pressure-vessel cover for loosening and tightening fastening screws thereon comprising a lift truck having an elevating platform whereon a carrier ring is mountable, means for pivoting the carrier ring about a horizontal axis, and means for vertically adjusting the carrier ring wih the elevating platform.

In accordance with another feature of the invention, the apparatus includes means for mounting a bearing block on said elevating platform, carrier-ring support means carried by the bearing block, and means for pivotally mounting the carrier ring on the support means.

The advantages derivable from the invention are primarily that the transporation, assembly and disassembly of the screw-tightening device at the manhole covers, under spatially narrow or limited conditions, are now possible in a relatively short time and in a convenient manner, so that the radiation load upon operating personnel during the inspection of nuclear power plants that are already in operation is considerably reduced. At the lift or elevating carriage, in addition to the carrier ring of the hydraulic screw-tightening device, all the other devices and components, such as hydraulic pump sets, hydraulic and compressed-air supply lines, expansion or elongation measuring devices and tools, are able to be fastened as well or transported by the elevating carriage or lift truck.

In accordance with a further feature of the invention, the support means are a support bearing, and the carriage-ring mounting means comprises bearing pins secured to the carrier ring and pivotally supported on the support bearing.

In accordance with an added feature of the invention, the support bearing comprises bearing shells wherein the carrier ring is releasably mounted.

In accordance with an additional feature of the invention, the apparatus includes means for arresting the carrier ring in different pivoted positions thereof.

In accordance with yet another feature of the invention, the apparatus includes means for mounting a bearing block on the elevating platform, carrier-ring support means carried by the bearing block, and means for pivotally mounting the carrier ring on the support means, the mounting means comprising a platform plate having a pedestal extending therefrom, the bearing block being constructed as a plug bracket and having a relatively longer and relatively shorter plug sleeve by which the bearing block is plugged onto the pedestal in two respectively different elevated positions.

In accordance with yet a further feature of the invention, the apparatus includes means for mounting a bearing block on the elevating platform, carrier-ring support means carried by the bearing block, and means for pivotally mounting the carrier ring on the support means, the support means being a support bearing formed as bearing shells, and the carrier-ring mounting means comprising bearing pins secured to the carrier ring and pivotally supported on the support bearing, the bearing shells being open at the top thereof, and including tightenable pressure means for securing the bearing pins in the bearing shells against slipping out therefrom.

In accordance with another feature of the invention, the apparatus includes means for mounting a bearing block on the elevating platform, carrier-ring support means carried by the bearing block, and means for pivotally mounting the carrier ring on the support means, the support means being a support bearing comprising bearing shells wherein the carrier ring is releasably mounted, and the carrier-ring mounting means comprising bearing pins secured to the carrier ring and pivotally supported on the support bearing, a latching arm connectable to the carrier ring and pivotable therewith about the horizontal pivot axis thereof, and a latching track carried by the bearing block and formed with recesses, the latch arm being receivable in the recesses.

In accordance with a further feature of the invention, the latching arm is in the form of a pawl finger, and the latching track constitutes a detent track associated therewith.

In accordance with an added feature of the invention, the lift truck has a chassis, and the vertical adjusting means comprise a scissors-like linkage carrying the elevating platform and linked to the chassis.

In accordance with an additional feature of the invention, the chassis has a frame, and the apparatus further includes a support plate for the scissors-like linkage fastened to the chassis below the frame thereof so that the elevating platform and the scissors-like linkage are at least partly lowerable to a position below the level of the chassis frame.

In accordance with another feature of the invention, the apparatus includes hydraulic power piston drive means for raising and lowering the elevating platform carried by the scissors-like linkage.

In accordance with a further feature of the invention, the chassis has a side whereon manual controls are located, a pressure-medium pump for the power-piston drive being located at the side, the pump being a hand pump and having a hydraulic-fluid storage tank associated therewith, and including at the side a manually actuatable hand lever for operating the pump, the hand lever being pivotable transversely to the longitudinal axis of the lift truck.

In accordance with an added feature of the invention, the apparatus includes a by-pass valve connected to the pump at the pressure side thereof for lowering the elevating platform and the scissors-like linkage.

In accordance with an additional feature of the invention, the apparatus includes a foot pedal located adjacent to the hand lever and connected to the by-pass valve for actuating the by-pass valve.

In accordance with yet another feature of the invention, the lift truck has a chassis, and the vertical adjusting means comprise a scissors-like linkage carrying the elevating platform and linked to the chassis, and including hydraulic power piston drive means for raising the elevating platform to an operative position of the screw tightening device and for lowering the elevating platform to a position in which the screw tightening device is transported, and means for latching the elevating platform in the lowered transporting position thereof to prevent the elevating platform from being raised by the power piston drive means.

In accordance with yet a further feature of the invention, the lift truck has a chassis including a substantially rectangular frame, the chassis having a side thereof, corresponding to a side of the substantially rectangular frame, whereon manual controls are located, and including steering columns for the lift truck located at the side of the chassis.

In accordance with yet an added feature of the invention, the steering columns are in the form of handle bars pluggable into the chassis in vicinity of the respective two corners of the chassis frame located at the side whereon the manual controls are located.

In accordance with yet an additional feature of the invention, the apparatus includes a platform plate carried by the elevating platform, and supply equipment for the carrier ring mounted on the platform plate and comprising a pneumatic pump to which flexible hose lines of a compressed-air supply source and inlet and outlet lines of an hydraulic circulatory loop of the screw-tightening device are connectible.

In accordance with another feature of the invention, the lift truck has a chassis having a side thereof wherein manual controls are located, and including a protective housing at the side wherein the supply equipment is received, the protective housing having compressed-air and hydraulic manometers, and hose-connection locations at front and rear sides thereof.

In accordance with a further feature of the invention, the lift truck has a chassis including a substantially rectangular frame, the frame having caster wheels at the four corners thereof, the caster wheels being pivotable through 360° horizontally and being at least partly arrestable.

In accordance with an added feature of the invention, the lift track has a chassis, and the vertical adjusting means comprise a scissors-like linkage carrying the elevating platform and linked to the chassis, the chassis having a frame, and including a support plate for the scissors-like linkage fastened to the chassis below the frame thereof so that the elevating platform and the scissors-like linkage are at least partly lowerable to a position below the level of the chassis frame, means for fastening the support plate in two fastening planes located at different levels relative to the chassis so as to effect an increase in at least one of the ground clearance of the chassis and the level to which the platform plate is advancible.

In accordance with an additional feature of the invention, the lift truck has a chassis, and including a rotary elevating arm, linked to the chassis so that it is pivotable upwardly and downwardly in a vertical plane, the rotary elevating arm having a free end to which the elevating platform is linked, and a parallelogram-control linkage connected to the elevating platform for displacing the platform in horizontal direction independently of any inclination of the rotary elevating arm.

In accordance with a concomitant feature of the invention, the apparatus includes guidance fingers disposable on the outer periphery of the carrier ring and projecting in direction in which the carrier ring is seatable on a pressure-vessel cover.

Other features which are considered as characteristic for the invention are set forth in the appended claims.

Although the invention is illustrated and described herein as embodied in a transport and assembly apparatus for screw-tightening devices, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
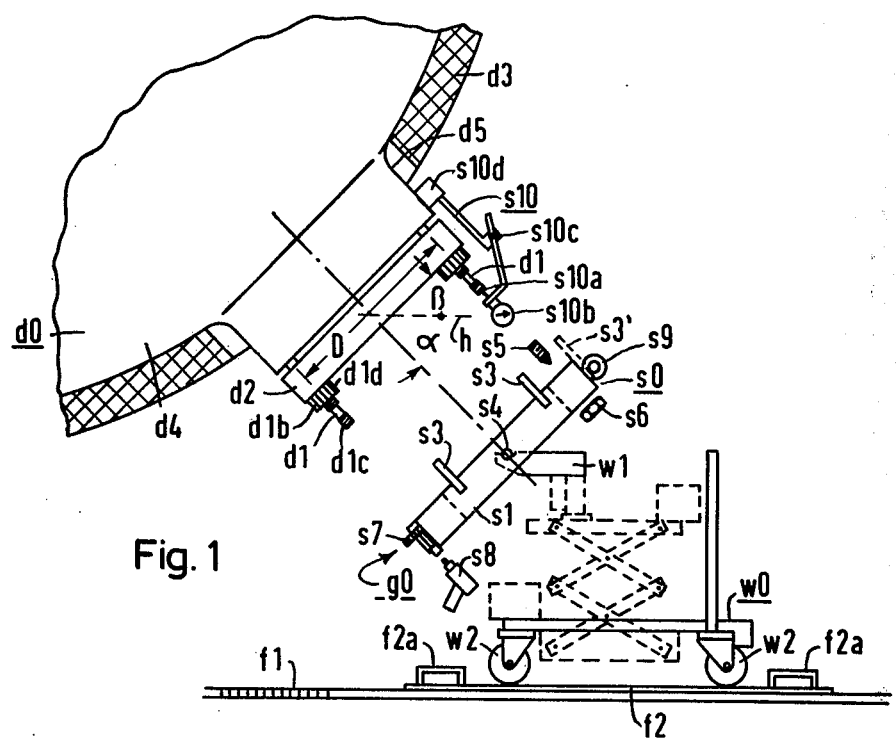
FIG. 1 is a diagrammatic elevational view partly in section of a manhole-cover portion of a steam generator for a pressurized water-nuclear power plant and apparatus for transporting and assembling screw-tightening devices in accordance with the invention which is set into operating position and which includes a carrier ring, a supporting fork and carriage wheels.
Figure 2:
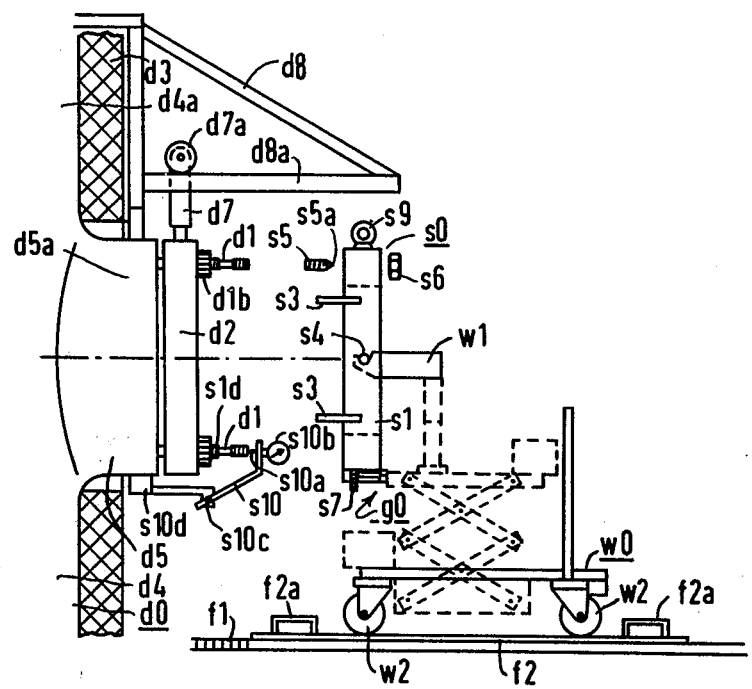
FIG. 2 is a view corresponding to that of FIG. 1 of the manhole cover portion of the steam generator at a secondary side of the latter with the transporting and assembling apparatus driven up to the manhole cover.

Referring now to the drawing and first, particularly, to FIGS. 1 to 8, there is shown therein an embodiment of a transport and assembly apparatus g0 for a screw-tightening device s0 (FIG. 3) which functions especially for loosening and tightening the cover screws d1 of pressure vessel covers d2 (note FIGS. 1 and 2). The apparatus g0, because of the compact construction thereof, is preferably applicable for loosening and tightening manhole covers 2, which are located on the primary side of nuclear steam generators d0 (FIG. 1), or manhole covers d2, which are located on the secondary side of nuclear steam generators d0 (FIG. 2). Furthermore, the apparatus g0 is applicable for tightening or loosening the screw coupling of a non-illustrated pressure container-cover which, in the same sense as in FIG. 2, seals off the manhole connecting piece of a pressure container or vessel in vertical position.

The steam generator d0 shown at least partly in sectional view in FIG. 1 and having thermal insulation d3 is a substantially cylindrical large hollow vessel, the specific construction of which is not pertinent to the invention of the instant application. What is essential is that a primary coolant-conducting primary chamber, which is closed by a spherical base d4, is provided with a manhole connecting piece d5 with a manhole cover d2 for the purpose of inspection, the manhole cover d2 being pressure-tightly clamped to the connecting piece d5 by a screw-coupling d1a located on a hole circle d6 having a diameter D. This screw coupling d1a has the hereinaforementioned cover screws d1 that are distributed uniformly over the hole circle d6 of the cover d2 (note the half of the cover d2 shown in phantom inserted into the manhole connecting piece d5), the cover screws d1 being formed as stud bolts engaging in the connecting piece d5 whereon the cover d2 formed with corresponding through-bores is seated and, finally, under axial prestressing of the stud bolts d1 is pressure-tightly clamped to the connecting piece d5 by means of retaining nuts d1b. The connecting-piece axis d5a extends at a downward inclination or declination at an angle $\alpha = 45°$ with respect to a horizontal reference line h, the upper cover half extending accordingly at an upward inclination with an angle $\beta = 45°$ with respect to the reference line h. In accordance with the inclination $\beta$ of the manhole cover d2, the carrier ring s1 of the screw-tightening device s0 is shown in FIG. 1 in a position with the same inclination $\beta$. The carrier ring s1 is pivotally and arrestably mounted on a support fork w1 of the elevating-platform or lift truck w0 by means of bearing s2 (of which only one is visible in FIG. 1). In the interest of simplicity, the elevating-platform truck or carriage w0 is shown only with the carriage wheels w2 and the support fork w1 thereof, while the remainder thereof is shown in broken lines; the elevating-platform truck w0 is described in greater detail hereinafter, however. Elevating-platform carriage or truck w0 and the screw-tightening device s0 with the carrying ring s1 form the transport and assembly apparatus g0 which is hereinafter simply referred to as the apparatus g0. Below the steam generator d0, there is disposed, at a spacing therefrom of about 1.5 m, a grating f1 as a support structure for operating or servicing personnel. The apparatus g0 is disposed on the grating f1 with the interposition of a base plate f2 provided with handles f2a, the base plate f2 serving for uniformly distributing the weight of the apparatus g0 over the grating f1. The screw-tightening device s0 can then be manipulating with the elevating-platform carriage w0 vertically and horizontally so that, with a ring of recesses (indicated at s2 and disposed congruent with the screw coupling d1a), it can be slipped over the screw coupling d1a and seated on the cover d2 as well as be removed correspondingly in reverse procedure. In this connection, four guide fingers s3 (of which only two are visible in FIG. 1) distributed over the outer periphery of the carrier ring s1 serve for axial guidance of the carrier ring s1 during the seating thereof, in that they slide along at the other periphery of the cover d2 and thus prevent canting of the carrier ring s1. At s3', a side view of such a guide finger is shown in broken lines. Guide sleeves s5 (of which only one is indicated in FIG. 1) are screwed crosswise onto the free threaded ends d1c of at least four cover screws d1 of a cover d2. They serve simultaneously as guidance during the seating of the carrier ring s1 and guide with the conical ends s5a thereof the carrier ring s1 formed with the recesses s2 accurately over the cover screws i.e. over the respective stud-bolt shaft d1d with the threaded end d1c and the retaining nut d1b. When the carrier ring s1 is seated, the guide sleeves s5 are again unscrewed and, in place thereof, on each of the thread ends d1c of the cover screws d1, which project through the carrier ring s1, grip nuts s6 (only one of which is shown in FIG. 1) are screwed and serve as engagement or abutment surfaces for hydraulic ring pistons s11 (note FIGS. 3 to 3b) associated with each cover screw d1. From FIGS. 3 to 3b, it is clearly taught that a multiplicity of driving pinions s7 shown in FIG. 1 are mounted, one for each cover screw d1, at the periphery of the carrier ring s1 and, when the carrier ring s1 is seated, a respective drive pinion s7 penetrates a slot in the carrier ring s1 and with the external toothing d1d meshes with a respective retaining nut d1b. The drive for the drive pinion s7 is effected by a drive-screwer motor s8 couplable with the pinion shaft s7a. Although only one ring screw s9 of the carrier ring s1 is shown in FIG. 1, four of them are actually distributed over the periphery and serve for suspending supporting or suspension wires, in the event the carrier ring s1 is to be raised out of the carrier fork w1 thereof or is to be inserted therein. A strain gauge or elongation measuring device s10 is provided with a feeler or sensor s10a, a dial gauge or extensometer s10b, a linkage s10c and a base or foot s10d (for example, an adhesive magnet foot) with which the axial prestress of the stud bolts d1 in the illustrated measuring position during hydraulic expansion or elongation of the stud bolts d1 can be measured.

FIG. 2 shows the steam generator d0 in section with a secondary-chamber wall d4a and appertaining manhole connectiong piece d5a. Moreover, the features in FIG. 2 like those in FIG. 1 bear the same reference characters. In contrast to FIG. 1, the manhole cover d2 of FIG. 2 is disposed in vertical position, it being rollable along horizontally in unscrewed condition by means of an arm d7 with a guide roller d7a on a guide rail d8a of a guide bracket d8, which is firmly anchored to the steam generator d0, thereby avoiding the need for additional hoisting equipment for the manhole cover d2. According to FIG. 1, the carrier ring s1 must be seated in the inclined 45° position thereof onto the screw coupling d6 of the manhole cover 3, whereas the corresponding operation must be effected in a vertical position in accordance with FIG. 2. It is also noted that in a conventional 1300 MW-pressurized water nuclear power plant (1000 MWe) with four steam generators and one pressure vessel, thirteen manhole covers are screwed on corresponding connecting pieces, namely three manhole covers per steam generator and one for the pressure vessel, which must be disassembled and reassembled at given regular intervals for inspection purposes.

Figure 3:
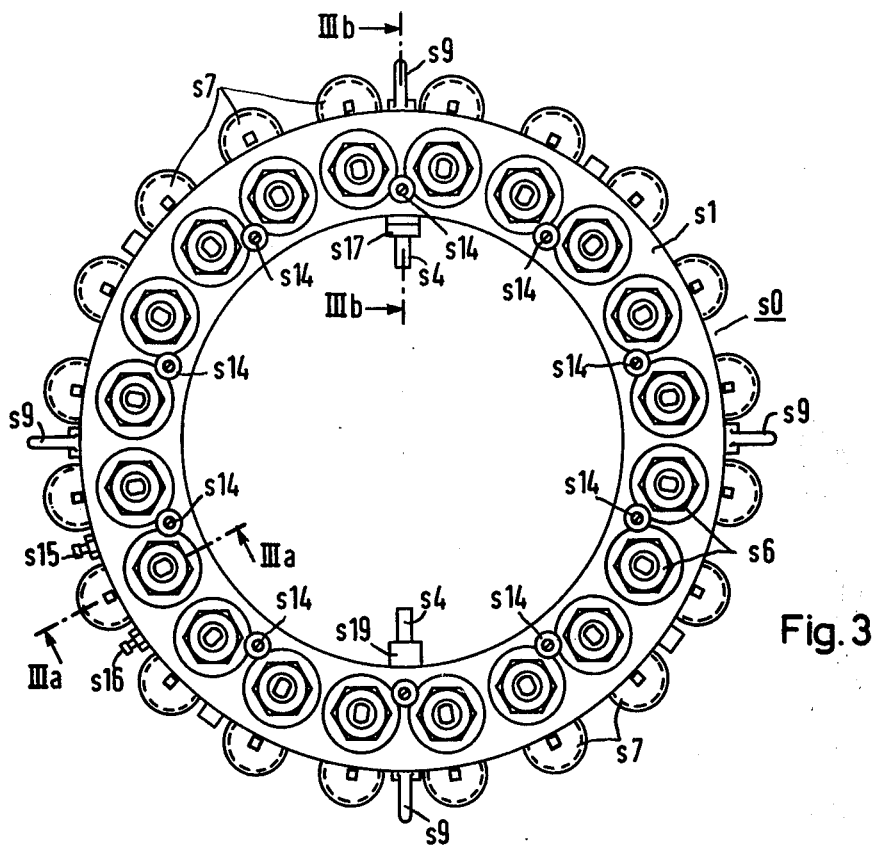
FIG. 3 is an enlarged plan view of the carrier ring of an hydraulic screw-tightening device for use with the invention.
Figure 3A:
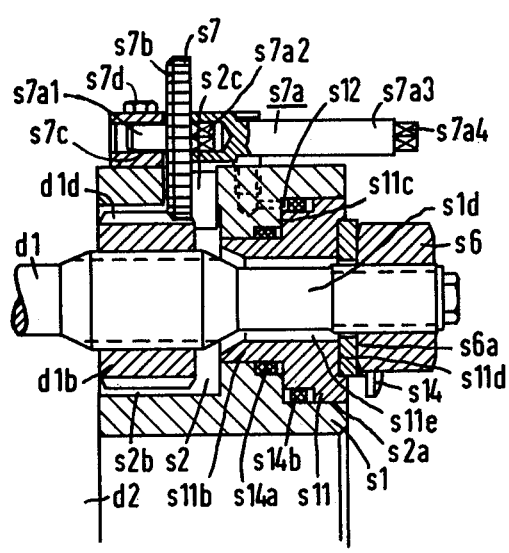
FIG. 3a is an enlarged sectional view of FIG. 3 taken along the line IIIa—IIIa in the direction of the arrows.
Figure 3B:
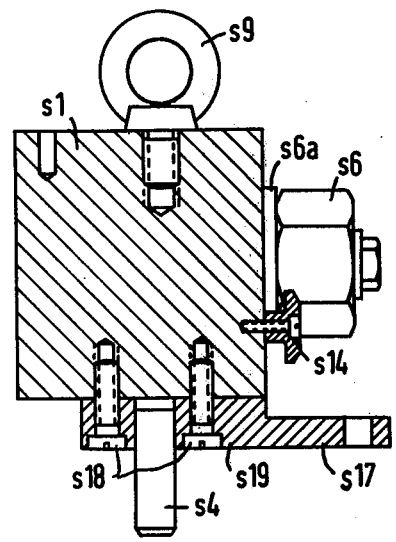
FIG. 3b is an enlarged sectional view of FIG. 3 taken along the line IIIb—IIIb in the direction of the arrows.

The carrier ring s1 of the screw-tightening device s0 shown in FIGS. 3 to 3b have the location and number of the cover screws d1 corresponding to the recesses or through-bores s2. In the illustrated embodiment of FIGS. 3 to 3b, twenty cover screws d1 and correspondingly twenty recesses s2 are provided in the carrier ring s1 with appertaining ring pistons s11 and drive pinions s7. The upper part s2a of the recesses s2 (Note FIG. 3a) forms a stepped cylinder chamber for the ring pistion s11 with working surface s11c. The working surface s11c is disposed in a pressure chamber s12, which is subjectible to a pressure medium (hydraulic liquid) through a bore s13 and through both piston-ring seals s14a on piston head s11a and s14b on the piston neck s11b is sealed from the outside. The lower part sb2 of the recesses s2 forms a chamber with which the carrier ring s1 surrounds the retaining nuts d1b when it is seated on the cover d2 as shown, the pinion s7 projecting through a slot s2c and, by means of the toothing s7b thereof meshing with the toothing d1d of the retaining nut d1b. The pinion s7 is rotatably mounted in a bearing box or housing s7c, the respective bearing housing s7c for each pinion s7 being tightly screwed to the outer periphery of the carrier ring s1 by means of screw bolts s7d. The pinion shaft s7a is formed of the actual shaft s7a1 thereof having a square end whereon an extension piece s7a 3, with a square s7a 4 at the free end thereof for coupling the same to the drive-screwer motor s8 (FIGS. 1 and 2), is stuck. FIGS. 3 to 3b show the shafts s1d of the cover screws d1 with previously screwed-on grip nuts s6 with the intermediary of washers s6a which are engaged by the upper side s11d of the pistons s11. The pistons s11 are slidable by through-bores s11e thereof over the shafts s1d of the cover screws d1. Indicator members s14 are respectively disposed between two mutually adjacent pistons s11 and slightly overlap the base of these pistons s11, the indicator members s14 indicating how far the pistons s11 may be advanced maximally out of the cylinder bore s2a thereof (indication for the stroke limit). A feed nipple s15 and a return nipple s16 for the pressure fluid are shown in FIG. 3, non-illustrated hydraulic lines being connectible thereto, and the pressure fluid being fed therethrough and though non-illustrated internal connecting channels provided in the carrier ring s1 to the pressure chambers s12 of every piston s11. When the pressure fluid is fed to the pressure chambers s12 (FIG. 3a), the pistons s11 are then, respectively, axially subjected thereto uniformly over the entire periphery of the carrier ring s1 and, at the given hydraulic pressure, conduct an axial force of corresponding size through the washer s6a and the grip nut s6 into the shaft s1d of the cover screws d1, so that this shaft s1d is stretched by a definite amount. If the cover d2 were tightened, the nuts d1b thus come free and can be individually unscrewed by starting the drive-screwer motor s8 through the pinion s7 (FIG. 3a), after which the hydraulic pressure can then be stopped. When tightening the cover d2, the retainer nuts d1b can, on the other hand, be drawn along i.e. against the cover d2, as they are screwed, while the shaft s1d is definedly hudraulically stretched in the hereinaforedescribed manner, so that when the hydraulic pressure is terminated, a defined axial stress remains within the screw shaft s1d which delivers the required compressive force for the cover d2.

Of the two bearing pins s4 fastened diametrically opposite one another to the inner periphery s1a of the carrier ring s1, the upper bearing pin s4, as viewed in FIG. 3, has a pawl finger s17 associated therewith (note also FIG. 3b), which is firmly screwed to the carrier ring s1 by means of screws s18 and firmly welded to a pawl finger s4 disposed in a receiving bore. The fastening of the lower pawl finger s4 shown in FIG. 3 is effected in the same manner with the exception that no pawl finger s17 is formed on the pin carrying member s19 therefor.

Figure 5:
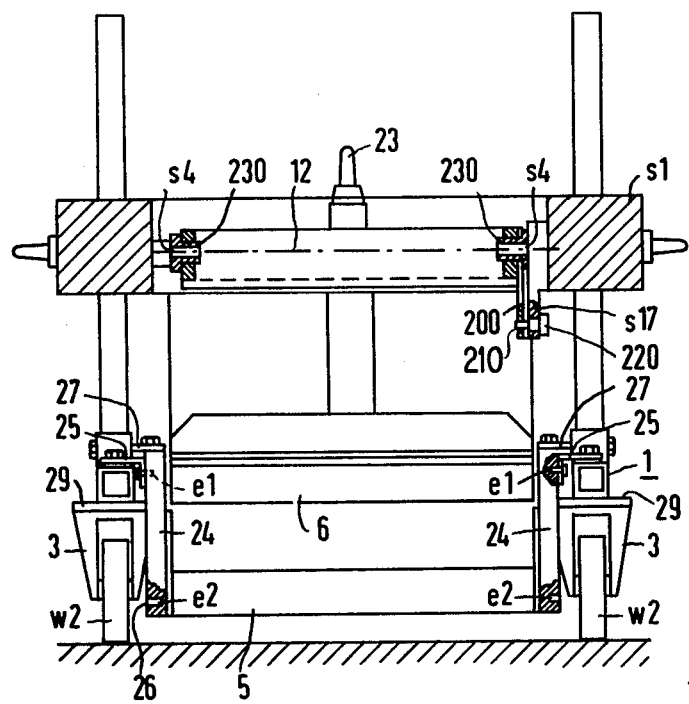
FIG. 5 is a side elevational view, partly in section, of FIG. 4, shown facing the front side of the device that is to be used on the manhole cover.
Figure 4:
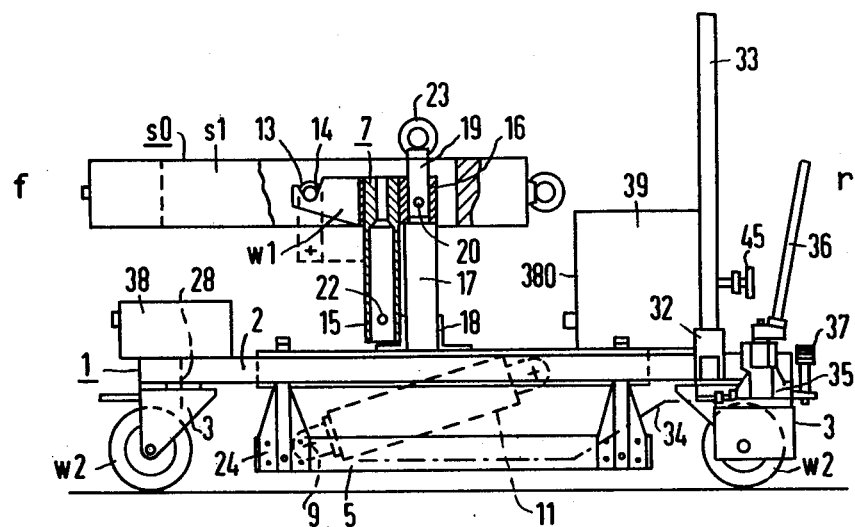
FIG. 4 is a diagrammatic elevational view of a preferred embodiment of a compact elevating-platform or lift truck with an hydraulic screw-tightening device.

An especially space-saving and compact construction of the elevating-platform carriage w0 is described hereinafter with respect to FIGS. 4 to 8. The elevating-platform or lift carriage w0 for the screw-tightening device s0 with the carrier ring s1 (note especially FIG. 7) is formed of a chassis or undercarriage 1 having a rectangular frame 2 on which roller cages 3 for carriage wheels w2 are mounted in vicinity of the four corners of the rectangular frame 2. A scissors elevating platform 4 is fastened with a base plate 5 to the frame 2 and has a table plate 6 with a bearing block 7. The lower end of the scissors elevating linkage 8 is articulatingly connected at partly visible bearing locations 9 at the base plate 5, and the upper end of the scissors elevating linkage 8 is articulatingly connected to the table plate 6 at indicated articulating points 10. In addition, a pair of hydraulic power piston-cylinder units 11 are linked to the base plate 5 in vicinity of the pivot axis defined by the bearing points 9, the piston-cylinder units 11 having respective piston rods 11a which, with respective scissors arms 8a, are linked to the articulating points 8b. In FIG. 7, the advanced position of the elevating table or platform 4 is shown wherein the table plate 6 is disposed plane parallel to the base plate 5. FIGS. 4 and 5 as well as 8 show, in contrast, the withdrawn position of the table or platform plate 6.

Figure 5A:
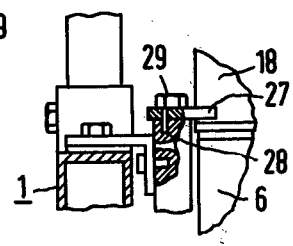
FIG. 5a is an enlarged fragmentary view of FIG. 5 showing the means for arresting the elevating platform for transporting purposes.
Figure 6:
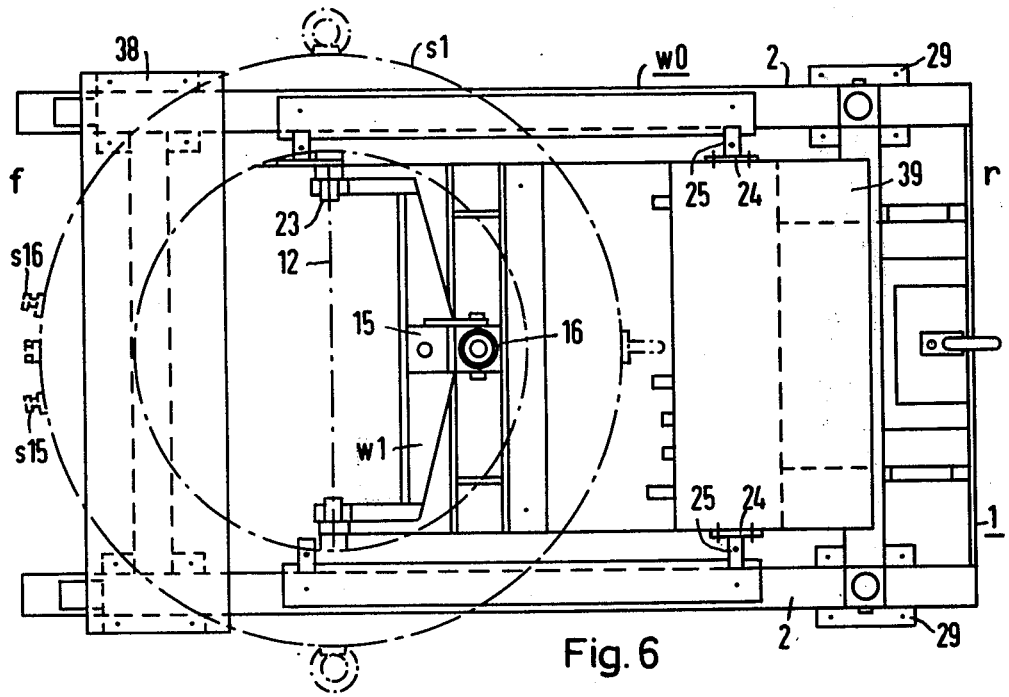
FIG. 6 is a top plan view of FIGS. 4 and 5.
Figure 7:
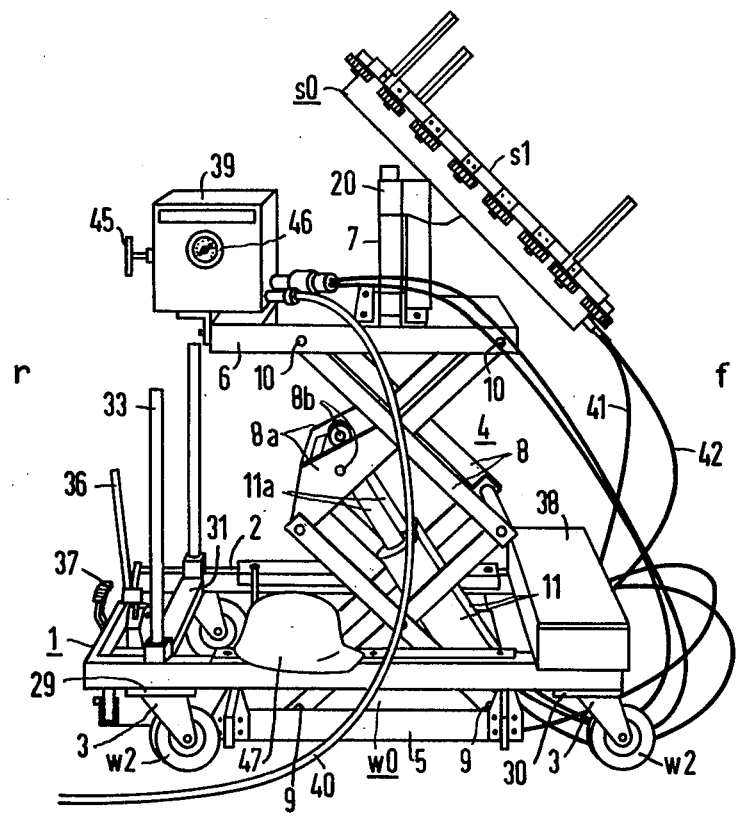
FIG. 7 is a perspective view of the apparatus of the invention with the elevating platform thereof advanced and the carrier ring upwardly inclined at an angle of 45°.

As is shown especially in FIGS. 5 to 5a and 6, the carrier ring s1 is pivotable at the elevating platform 6 of the lift carriage w0 about a horizontal axis 12 and is vertically adjustable mounted with the elevating platform 6. For this purpose, the carrier ring s1 is inserted into upwardly open bearing shells 13 (FIG. 4) of the carrier fork w1 and, in this inserted condition, is secured by means of tightenable pressure members 14 against falling out of the bearing shells 13 when being pivoted. The bearing block 7 with the carrier fork w1 is constructed as a plug console with a respectively longer plug sleeve 15 and a respectively shorter plug sleeve 16, with which it is pluggable into a pedestal 17 of the platform plate 6 in two different elevated positions. The pedestal 17 has a solid or at least a thick-walled square cross section; it is fixed at the foot thereof rigidly to the platform plate 6 by angle supports 18 on two sides of the pedestal 17, the angle supports 18 extending transversely across the platform plate 6 and being screwed thereto. At the upper end thereof, the pedestal 17 has a plug-in extension 19 with a circular cross section (note especially FIG. 4). Both plug sleeves 15 and 16 have a tubular inner cross section which exactly matches the outer cross section of the plug-in extension 19, the bearing block 7 with the shorter plug sleeve 16 thereof being stuck onto the extension 19 in the lower elevated position in FIG. 4. This position is secured by a plug pin 20 which is pluggable into a corresponding through-bore 21 formed in the respective plug-in extensions 19 and 22 of both plug sleeves 15 and 16. A ring screw 23 is screwed into the plug-in extension 19, cables from non-illustrated elevating devices being able to be hung thereon in case the elevating carriage w0 is to be lifted within the power plant for very great transport distances.

Figure 4B:
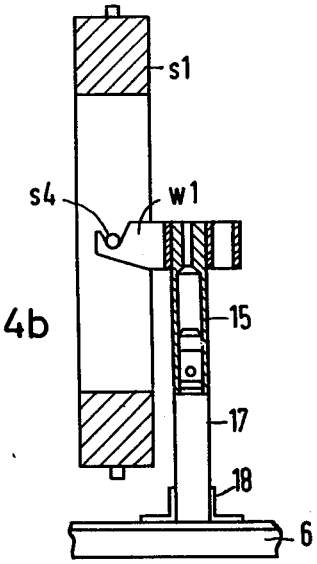
FIG. 4b is a fragmentary view of FIG. 4 showing the bearing block of the transporting and assembling apparatus in a second, higher insertion setting for manipulating the screw-tightening device for a secondary-side steam generator-manhole cover screw coupling.
Figure 4A:
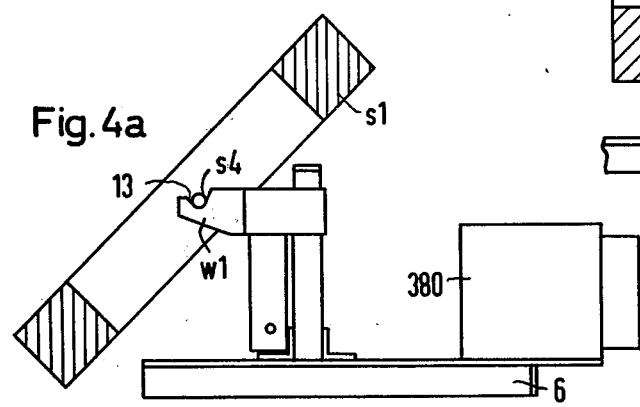
FIG. 4a is a fragmentary view of FIG. 4 showing the bearing block of the transporting and assembling apparatus in a first, lower insertion setting for manipulating the screw-tightening device for a manhole cover located on a primary side of the steam generator, in accordance with FIG. 1.

FIG. 4a shows the plug-in position of FIG. 4 in a sectional view, the carrier ring s1 being inclined at an angle of 45° to the horizontal; this pivot setting of the carrier ring s1 and given elevated position of the bearing block 7 serving for assembly and disassembly of a manhole cover on a steam generator-primary side as shown in FIG. 1. The other elevated position, wherein the bearing block 7 is plugged into the pedestal 17 with the longer plug sleeve 15 thereof, is shown in FIG. 4b. In addition, the carrier ring s1 is disposed in vertical position in FIG. 4b. This position of the carrier ring s1 and of the bearing block 7, as shown in FIG. 4b, serves preferably for disassembly and assembly of the manhole cover on the steam generator-secondary side as disclosed in FIG. 2.

The carrier ring s1 is lockable within the bearing shell 13 thereof in the various pivot positions thereof, and, in fact, especially in the horizontal position thereof shown in FIG. 4, the vertical position shown in FIGS. 2 and 4b, and the 45° inclined position shown in FIGS. 1, 4a and 7. For this purpose, the hereinaforementioned pawl finger s17 (note especially FIGS. 4 and 5) serve, a side plate 200 fastened vertically to the bearing block 7 being associated with the pawl finger s17 and serving as a pawl track. In pawl recesses 210, this side plate 200 can grip the pawl finger s17 with a pawl projection 220 constructed in the form of a through-bolt. The mounting or bearing for the carrier ring s1 on the support fork w1 of the bearing block 7 within the bearing shells 13 is provided (note especially FIG. 5) especially precisely and abrasion-free by means of plug sleeves 230 formed of a tough, abrasion-free bearing material, such as brass, bronze or a suitable synthetic material like polytetrafluorethylene or a polyamide, for example. The base or support plate 5 of the scissors elevating platform 4 (note especially FIGS. 4, 5 and 7) is fastened below the chassis frame 2 so that the platform plate 6 and the scissors linkage 8 are lowerable at least partly below the level of the chassis frame 2 and, in this manner, a very compressed, compact contruction is attained. The base plate 5 is fastened to i.e. suspended from the frame 2 in vicinity of the four corners thereof on four supporting arms 24, fastening angles 25 (FIG. 5) with corresponding screw bolts serving as connecting members between the arms 24 and the frame 2. To increase the ground clearance and/or to increase the level to which the platform plate 6 is advanceable, the base plate 5 is fastenable through the support arms 24 thereof into two fastening planes that are located at difference levels, namely fastening planes e1 (compact setting according to FIGS. 4, 5 and 7) and e2 relative to the chassis 1 or the frame 2. If the base plate 5 is fastened to the fastening locations 26 of the fastening plane e2, the ground clearance is thus increased, on the one hand, and the platform plate can travel accordingly farther upwardly, on the other hand. The elevating platform 6 is latchable by pivot latches 27 (shown in enlarged detail in FIG. 5a) in the withdrawn transport setting thereof shown in FIGS. 5 and 8, the pivot latch 27 pivoting over the base of the platform plate 6 and arrested in this position by a pin 28 with a screw 29. In FIG. 5, the pivot latches 27 are, in contrast, pivoted out of the engagement region of the platform plate 6. The apparatus g0 or d0 and the lift carriage w0 can then be lifted by the platform plate 6 latched by the pivot latches 27, at the ring screws 23 of the platform plate 6, without any loading being applied by the carriage weight to the lifting position drive 11.

Figure 8:
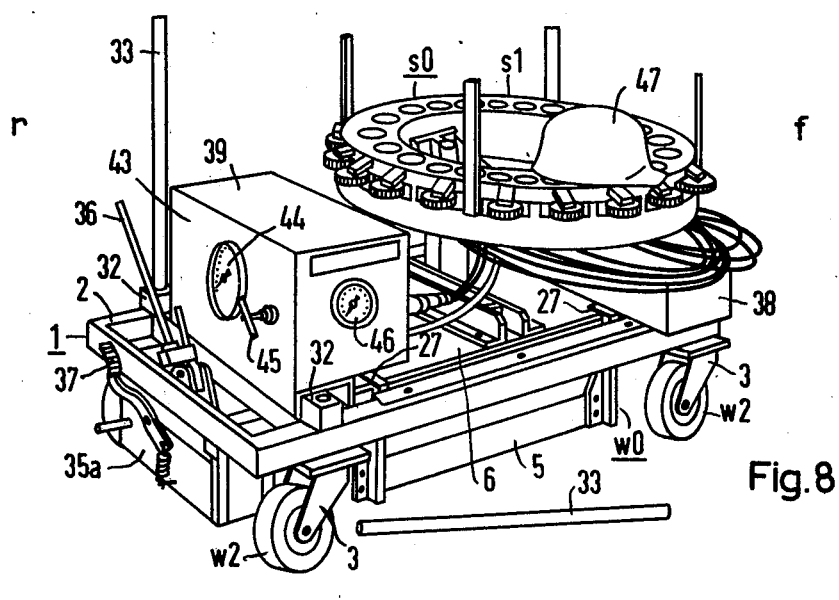
FIG. 8 is another perspective view of the apparatus in a compact transport setting with the elevating platform withdrawn, one of the handle bars or links thereof having been removed.

Each of the caster wheels w2 is mounted with the roller cage 3 thereof in a pivot bearing 28, as shown in FIG. 4, and is pivotable through 360°. Respective bearing plates 29 (FIG. 7) are fastened to the frame 2 for these pivot bearings 28. The caster wheels w2 are lockable in position at the front side f of the lift carriage w0 by means of respective locking levers 30 of which one is visible in FIG. 7. The lift carriage w0 is movable by means of this roller or wheel bearing system that slight deviations of the carrier ring s1 when set or seated on the manhole cover (FIGS. 1 and 2) can be automatically compensated for by an adjustment of shift in the carriage w0. To improve the steering of the carriage w0, vertical handle bars or columns 33 are inserted in respective bearing bushings 32 (note FIG. 8) at the rear r of the carriage w0 in vicinity of a separate cross beam 31 (FIG. 7), which is connected to and braces the frame 2. The handle bars 33 are removable, as shown in FIG. 8, in order to permit underrunning with the lift carriage w0 under narrow-space conditions.

As is shown especially in FIG. 4, the power piston-drive 11 for the scissors elevating platform 4 is connected through an hydraulic line 34 to the pressure side of a pressure-medium pump 35 which is, in turn, fastened to the frame 2. This has to do especially with an hydraulic hand-pump with a manually operable lever 36 that is pivotable transversely to the longitudinal axis of the carriage w0, an hydraulic fluid storage tank 35a and a non-illustrated by-pass valve or blow-off safety valve for the pressure circulatory loop of the pump which is actuatable by a foot pedal 37, mounted adjacent to the manual lever 36, for controllable lowering of the platform plate 6. On the front side of the chassis 1, a toolbox 38 is furthermore fastened to the frame 2, the grip nuts, the washers, the drive-screwer motor and the like being storable therein. On the opposite side of the chassis 1, the hydraulic supply equipment 380 for the carrier ring s1 of the screw-tightening device s0 is fastened onto the elevating platform 6. In a protective housing 39, an airhydraulic or pneumatic pump, not otherwise illustrated, is located, and is supplied on the air-side thereof through a compressed-air line 40 (FIG. 7). In addition, the inlet and outlet lines 41 and 42 of the hydraulic circulatory loop of the screw-tightening device s0 are connected to the respective connecting pieces of the protective housing 39. As is shown particularly in FIG. 8, an hydraulic manometer 44 and a control handle 45 for the hydraulic control valve for connecting or disconnecting the hydraulic pressure loop are located on the operating front side 43 of the protective housing 39. Furthermore, a compressed-air manometer 46 is provided. In FIGS. 7 and 8, a protective helmet 47 is shown to provide a basis for comparison as to size.

In the interest of simplicity, the scissors linkage 8 has been omitted from FIGS. 4 and 5.

In view of the foregoing, the operation of the apparatus g0 i.e. the lift carriage w0 with the screw-tightening device s0, is believed to be readily understandable: The lift carriage w0 is advanced to the manhole cover d2 (FIGS. 1 and 2) when the platform plate 6 has been lowered (FIG. 8), the wheels w2 at the front side of the carriage w0 being arrested by means of the lever 30 in a suitable position of the lift carriage w0. At the latest, the pivot latches 27 of the transport safety system are now unlatched if they had been engaged for elevating transport of the apparatus, and the carrier ring s1 is suitably clicked into place for the 45° inclined-position thereof, after which, by operating the hand pump 36, it can be advanced with the platform plate 6 and the scissors linkage 8 to the required elevated position. There then occurs, if necessary, a readjustment of the lift carriage w0 when the levers 30 are unlatched and also at the selected elevation so that the carrier ring s1, after the protective sleeves s5 have been placed on the thread ends d1c, can be slipped onto the cover screw joint d6. The protective sleeves s5 are then removed and the grip nuts s6 are screwed on. The hydraulic stressing of the cover screws d1 is then effected in the hereinaforedescribed manner. If the lift carriage w0 with the carrier ring s1 is to be set for a vertical position of the manhole cover d2 (FIG. 2), the bearing block 7 must be brought with the longer plug sleeve 15 thereof into the position of FIG. 4b before lifting the platform plate 6, with the carrier ring s1 lifted out, after which the suspension of the carrier ring s1 by means of a suitable lifting device can again be effected. After loosening or tightening the cover screw joint d6, the cover d2 remains held at the stud bolts; the grip nuts s6 are unscrewed and the protective sleeves s5 are again stuck onto the thread ends d1c of the cover screw joint d6. Thereafter, the screw-tightening device s0 and the carrier ring s1 are again lifted away from the manhole cover d2 by manipulating the lift carriage w0 and slowly lowering the platform plate 6 with the aid of the foot lever or pedal 37.

Figure 9:
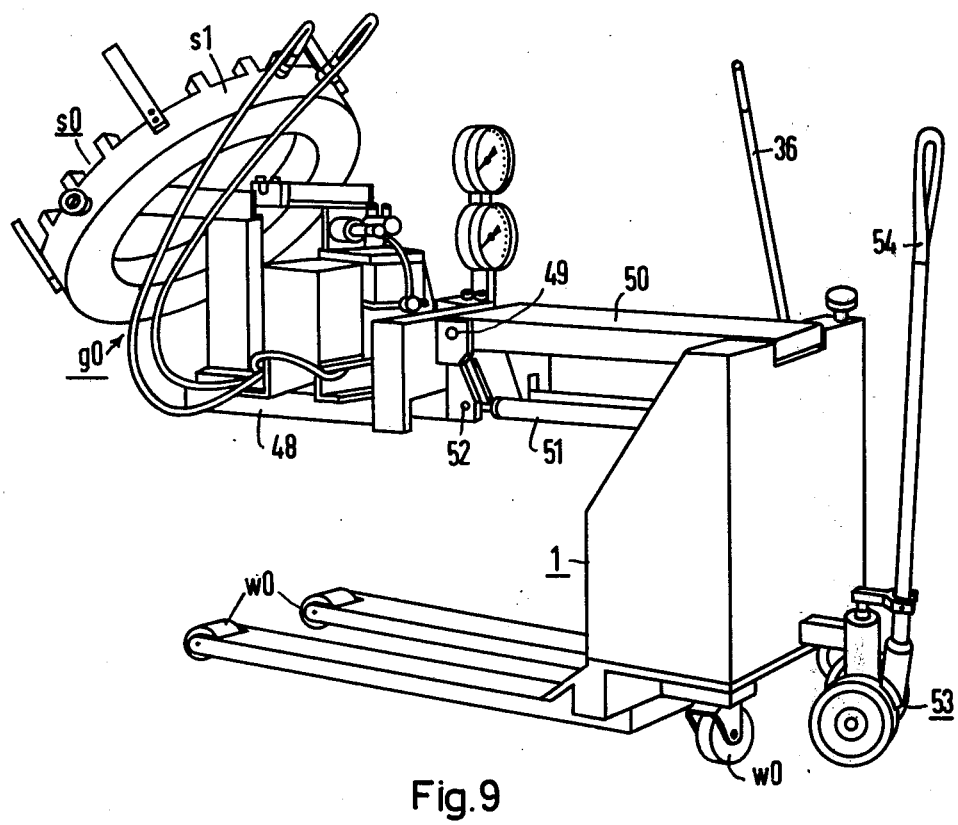
FIG. 9 is a perspective view of another embodiment of the invention with apparatus having a rotary elevating table for the screw-tightening device.
Figure 9A:
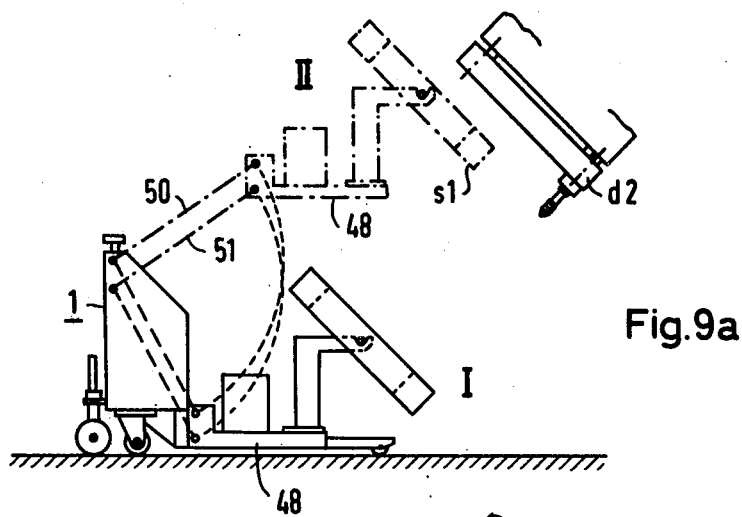
FIGS. 9a, 9b and 9c are reduced diagrammatic elevational views of the apparatus of FIG. 9 shown in various advanced portions in relationship to a manhole cover upwardly inclined at an angle of 45°.
Figure 9B:
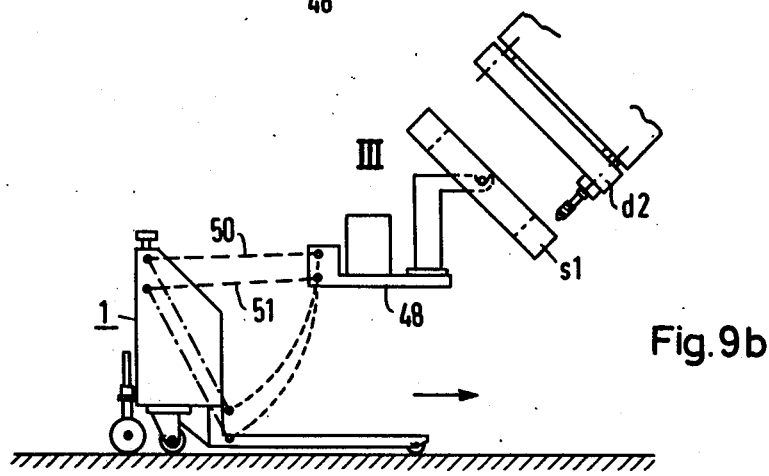
Figure 9C:
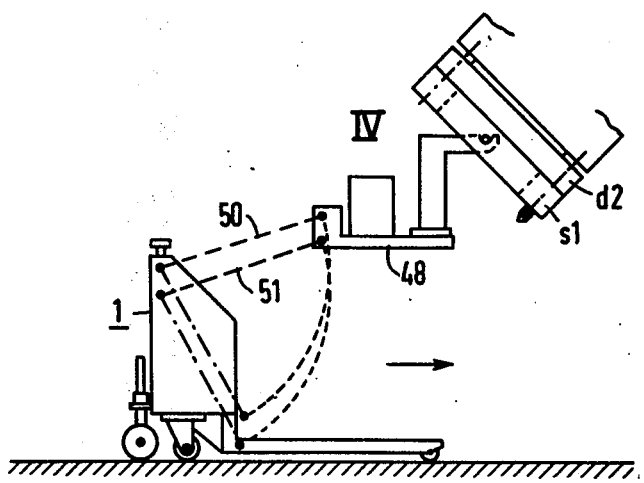

FIGS. 9, 9a, 9b and 9c show another embodiment of the apparatus g0 which differs from the hereinaforedescribed embodiment in that the elevating platform 48 is a rotary elevating platform which is linked by a swivel joint 49 to the free end of the rotary lift arm 50, the latter, in turn, being linked to the chassis or undercarriage 1 in such a manner that it is upwardly and downwardly pivotable in a vertical plane. In order that the rotary elevating platform 48 be located always in a horizontal position, it is respectively automatically displaceable in horizontal direction independently of the inclination of the rotary lift or elevating arm 50 by means of a parallelogramcontrol linkage 51 which is linked to the rotary elevating table 48 by means of the linkage 52. Moreover, a further difference in the embodiment of FIG. 9 from that hereinbeforedescribed, is that the embodiment of FIG. 9 has a separate pole or hitch 53 with a steering arm 54 at the rear side r of the elevating carriage or truck w0. A pump lever 36 is shown in FIG. 9 for hydraulically elevating the rotary elevating arm 50. This elevating action is effected, as shown in FIGS. 9 to 9c, by an elevating-swivelling movement. FIG. 9 shows, on the one hand, the lowered transport setting I and, on the other hand, in phantom, an advanced most elevated setting II. According to FIG. 9b, there is shwon a further setting III of the rotary elevating platform 48 just before the carrier ring s1 is seated on the cover d2, wherein the carrier ring s1 is brought into alignment with the manhole cover d2. By slowly lifting and adjusting or orienting the rotary elevating platform 48 and slowly advancing it in direction of the arrow 55, the rotary elevating platform 48 can then be brought into a setting or position IV as shown in FIG. 9c wherein the carrier ring s1 is seated on the cover d2. The removal or lifting away of the carrier ring s1 from the manhole cover d2 is effected in a similar manner, however, in reverse sequence.

There are claimed:

1. Transport and assembly apparatus for a screw-tightening device having a carrier ring seatable on a pressure-vessel cover for loosening and tightening fastening screws thereon comprising a lift truck having an elevating platform whereon a carrier ring is mountable, means for pivoting the carrier ring about a horizontal axis, and means for vertically adjusting the carrier ring with said elevating platform, and including means for mounting a bearing block on said elevating platform, carrier-ring support means carried by said bearing block, and means for pivotally mounting the carrier ring on said support means, said mounting means comprising a platform plate having a pedestal extending therefrom, said bearing block being constructed as a plug bracket and having a relatively longer and a relatively shorter plug sleeve by which said bearing block is pluggable onto said pedestal in two respectively different elevated positions.

2. Transport and assembly apparatus for a screw-tightening device having a carrier ring seatable on a pressure-vessel cover for loosening and tightening fastening screws thereon comprising a lift truck having an elevating platform whereon a carrier ring is mountable, means for pivoting the carrier ring about a horizontal axis, and means for vertically adjusting the carrier ring with said elevating platform, wherein said lift truck has a chassis, and wherein said vertical adjusting means comprise a scissors-like linkage carrying said elevating platform and linked to said chassis, including hydraulic power piston drive means for raising and lowering said elevating platform carried by said scissors-like linkage, said chassis having a side whereon manual controls are located, a pressure-medium pump for said power-piston drive being located at said side, said pump being a hand pump and having a hydraulic-fluid storage tank associated therewith, and including at said side a manually actuatable hand lever for operating said pump, said hand lever being pivotable transversely to the longitudinal axis of said lift truck.

3. Apparatus according to claim 2 including a by-pass valve connected to said pump at the pressure side thereof for lowering said elevating platform and said scissors-like linkage.

4. Apparatus according to claim 3 including a foot pedal located adjacent to said hand lever and connected to said by-pass valve for actuating said by-pass valve.

5. Transport and assembly apparatus for a screw-tightening device having a carrier ring seatable on a pressure-vessel cover for loosening and tightening fastening screws thereon comprising a lift truck having an elevating platform whereon a carrier ring is mountable, means for pivoting the carrier ring about a horizontal axis, and means for vertically adjusting the carrier ring with said elevating platform, said lift truck having a chassis and said vertical adjusting means comprising a scissors-like linkage carrying said elevating platform and linked to said chassis, said chassis having a frame, and including a support plate for said scissors-like linkage fastened to said chassis below said frame thereof so that said elevating platform and said scissors-like linkage are at least partly lowerable to a position below the level of said chassis frame, means for fastening said support plate in two fastening planes located at different levels relative to said chassis so as to effect an increase in at least one of the ground clearance of the chassis and the level to which the platform plate is advanceable.

6. Transport and assembly apparatus for a screw-tightening device having a movable carrier ring seatable on a flange of a pressure-vessel cover for loosening and tightening cover nuts on cover screws disposed in recesses formed in the cover, the screw-tightening device having a plurality of hydraulic tightening means attachable to the cover screws, each hydraulic tightening means including a cylinder, a piston slideably received in said cylinder and bearable against a grip nut on a cover screw, a pressure supply feedline connected to the tightening means, drive pinion means pivotally disposed on the carrier ring and coupleable to the cover, and drive-screwer means for driving said cover through said pinion, comprising a truck lift having a chassis, a vertically adjustable scissors-like linkage carrying an elevating platform and linked to said chassis, the carrier ring being mounted on said elevating platform, means for pivoting the carrier ring about a horizontal axis, a bearing block mounted on said elevating platform, bearing shells carried by said bearing block, bearing pins secured to the carrier ring and releasably pivotally supported in said bearing shells, and means for arresting the carrier plate in different pivoted positions thereof.

7. Apparatus according to claim 6 including a pawl finger connectible to the carrier ring and pivotable therewith about said horizontal pivot axis thereof, said pawl finger having a bolt thereon and a track carried by said bearing block and formed with recesses, said bolt being receivable in said recesses.

8. Apparatus according to claim 6 wherein said chassis has a frame, and including a support plate for said scissors-like linkage normally fastened to said chassis below said frame thereof within a first fastening plane so that said elevating platform and said scissors-like linkage are at least partly lowerable to a position below the level of said chassis frame, means for fastening said support plate in a second fastening plane located at a higher level relative to said chassis and said first fastening plane so as to effect an increase in the ground clearance of the base plate and the level to which the platform plate is advanceable.

9. Apparatus according to claim 6 including hydraulic power piston drive means for raising and lowering said elevating platform carried by said scissors-like linkage, said chassis having a side whereon manual controls are located, a pressure-medium pump for said power-piston drive being located at said side, said pump being a hand pump and having a hydraulic-fluid storage tank associated therewith, and including at said side a manually actuatable hand lever for operating said pump, said hand lever being pivotable transversely to the longitudinal axis of said lift truck.

10. Apparatus according to claim 9 including a by-pass valve connected to said pump at the pressure side thereof for lowering said elevating platform and said scissors-like linkage.

11. Apparatus according to claim 10 including a foot pedal located adjacent to said hand lever and connected to said by-pass valve for actuating said by-pass valve.

12. Apparatus according to claim 10 wherein said power piston drive means are operable for raising said elevating platform to an operative position of the screw-tightening device and for lowering said elevating platform to a position in which said screw-tightening device is transported, and means for latching said elevating platform in said lowered transporting position thereof to prevent said elevating platform from being raised by said power piston drive means.

13. Apparatus according to claim 6 including a platform plate carried by said elevating platform, and supply equipment for the carrier ring mounted on said platform plate and comprising a pneumatic pump to which flexible hose lines of a compressed-air supply source and inlet and outlet lines of a hydraulic circulatory loop of the screw-tightening device are connectible.

14. Apparatus according to claim 13 wherein said lift truck has a chassis having a side thereof whereon manual controls are located, and including a protective housing at said side wherein said supply equipment is received, said protective housing having compressed-air and hydraulic manometers, and hose-connection locations at front and rear sides thereof.

* * * * *